United States Patent [19]

Lorch

[11] 4,449,551
[45] May 22, 1984

[54] MIXING VALVE

[75] Inventor: Werner Lorch, Schramberg, Fed. Rep. of Germany

[73] Assignee: Hans Grohe GmbH & Co., Fed. Rep. of Germany

[21] Appl. No.: 274,672

[22] Filed: Jun. 17, 1981

[30] Foreign Application Priority Data

Jun. 28, 1980 [DE] Fed. Rep. of Germany ....... 3024518

[51] Int. Cl.³ .......................................... F16K 11/087
[52] U.S. Cl. ............................. 137/625.41; 137/625.4
[58] Field of Search ......................... 137/625.41, 625.4

[56] References Cited

U.S. PATENT DOCUMENTS

| | | | |
|---|---|---|---|
| 2,991,009 | 11/1959 | Parker | 137/625.41 |
| 3,056,418 | 10/1962 | Adams et al. | 137/625.41 X |
| 3,417,783 | 12/1968 | Manoogian et al. | 137/625.41 |
| 3,674,048 | 7/1972 | Manoogian et al. | 137/625.41 X |
| 3,882,897 | 5/1975 | Manoogian et al. | 137/625.4 |
| 4,243,063 | 1/1981 | Parkison | 137/625.41 X |
| 4,352,369 | 10/1982 | Lorch | 137/270 |

FOREIGN PATENT DOCUMENTS

| | | |
|---|---|---|
| 1600995 | 6/1967 | Fed. Rep. of Germany . |
| 1550391 | 9/1969 | Fed. Rep. of Germany . |
| 2246763 | 9/1972 | Fed. Rep. of Germany . |
| 2705165 | 8/1977 | Fed. Rep. of Germany . |
| 2344771 | 11/1977 | Fed. Rep. of Germany ........................ 137/625.41 |
| 7426609 | 5/1975 | France . |
| 1179942 | 2/1970 | United Kingdom ............. 137/625.4 |

Primary Examiner—Arnold Rosenthal
Attorney, Agent, or Firm—Steele, Gould & Fried

[57] ABSTRACT

A single mixing valve has a ball-like valve plug with hot and cold water inlet ports and outlet ports and a valve housing having a valve seat face of the same form as the plug. The housing has inlet ducts for the hot and cold water to be mixed and an outlet duct for the mixed water, the ducts porting into the face. A driving part is joined with the plug and is able to be rocked therewith for changing the rate of outlet of water from the valve and to be moved for changing the mixing ratio of the hot and cold water. The driving part is limited in its rocking motion to motion about a rocking axis running through a middle point of the plug and is limited to turning about an axis of turning running through the middle point. The valve has a guide plate, which may be turned in a plane parallel to the rocking axis of the driving part, with same in relation to the housing. The plate has a slot in which the driving part is keyed while being able to be moved along the slot. With this system it is not possible for the plug to be moved into skew positions.

39 Claims, 6 Drawing Figures

MIXING VALVE

BACKGROUND OF THE INVENTION

The present invention is with respect to a mixing valve for liquids and, more specially for plumbing purposes such as a "single control faucet" (as such valves are generally known), having a ball-like or spherical plug with inlet and outlet ports therein, said ports being joined together, a valve housing having a seating face of the same form as said plug, which is positioned therein, the housing having inlet ducts for the liquids to be mixed and an outlet duct. The inlet and outlet ducts come to an end in ports in the seating face and the plug may be moved by a driving part joined with it and being able to be rocked for changing the liquid outlet rate from the faucet and able to be rotated for changing the mixing ratio of the liquids making their way into the faucet.

Such single mixing valves have come to be widely used because they may readily be worked with little trouble. This is especially so because only one hand is needed for operation, such operation being, on the one hand, simply pushing down the driving part or the handle joined therewith for turning off the water, while, when the driving part or the handle joined therewith is lifted, the valve is turned on.

A shortcoming of single mixing valves of the sort noted is, however, that, because of the geometry of the plug inlet and outlet ports, it is not possible to make certain that, on rocking the driving part or handle of the valve, the mixing ratio of the liquid supplied to the valve and, in this connection for example, the temperature of the mixed liquid coming from the valve is kept constant. A further shortcoming of single control valves of the sort presently addressed is that the position of the axis, about which the driving part together with the plug may be rocked, is changed in a way dependent on the adjustment made for the mixing ratio, this shortcoming being especially serious in cases in which the plug driving part does not have a simple more or less ball-like grip, but has a loop- or horseshoe-like handle running outwards on one side (for example towards the user) in the direction of rocking of the driving part, the arm being in a plane parallel to the axis of rocking of the driving part so that its position is changed in a way dependent on the adjustment made for the mixing ratio. All this makes operation of the faucet more complex and less readily possible.

SUMMARY OF THE INVENTION

One purpose of the present invention is that of overcoming this shortcoming and providing a single mixing valve of the sort noted making certain of a more or less unchanging mixing ratio while the valve is being opened and shut. A further purpose of the present invention is that of stopping the axis of rocking of the driving part being moved into sloping positions in different planes so that the driving part of the plug may have, if desired, a grip or handle running outwards in the direction of rocking of the driving part, this making operation of the valve very much simpler, without the shortcomings noted earlier being produced.

For effecting this purpose and further purposes, in the present invention a single mixing valve of the sort noted is characterized in that the driving part may only be moved about an axis of rocking running through a middle point of the plug and/or about an axis of turning running through the middle point of the plug so as to be normal to the axis of rocking, the driving part being key-guided in a slot with parallel guiding edges the slot being formed in a plate which may be turned in its own plane with the driving part in relation to the rest of the valve housing, the guide plate being positioned parallel to the rocking axis of the driving part. Putting it differently, the driving part is locked in rotation with the guide plate, but may be moved backwards and forwards thereacross in the slot. In this respect, the axis of turning of the plug is best the axis of turning of the guide plate as well.

In the single control faucet or mixing valve of the present invention, it will be seen that steps have been taken to see that the axis, about which the driving part may be rocked for changing the output rate of the liquid is, in all cases, in a plane parallel to the guide plate (that is to say without being dependent on the adjustment made beforehand of the mixing ratio by turning the plug using the driving part) and the axis is not, as in prior art single mixing valves, of the sort noted at the start, in the outer face of a cone. If the present single mixing valve is for example so fixed at the edge of a washbasin that the guide plate, forming a sort of slide for guiding the driving part, is horizontal, the outcome will be that the plane, in which the driving part is to be rocked for changing the rate of water coming from the valve, will be upright in all cases (without being dependent on what mixing ratio adjustment was made in the first place using the driving part), this special design making opening and shutting of the present single mixing valve very much simpler and making certain of an unchanging mixing ratio when the valve is being turned on and off. Much the same is true if the present single mixing valve is fixed in position on a bathroom wall over the edge of a bath so that the guide plate is upright. The plane, in which the driving part has to be rocked for changing the rate of water coming from the valve, is, in this case, normal to the wall without, in any way, being dependent on the adjustment made earlier for the mixing ratio using the driving part, so that the driving part only has to be rocked, for turning off the valve, in a plane which is normal to the wall to which the valve is fixed.

In the single mixing valve of the present invention, the family of possible planes, in which the driving part may be rocked, and dependent on the mixing ratio adjustment made, come together at the middle point of the plug and are normal to the plane of the guide plate. In other words, there is a crossing over of the planes at the middle point. In prior art single mixing valves of the sort noted, such planes do go through the middle point of the plug but, however, they are not normal to a common plane and are, in fact, in each case, normal to the outer face of an imaginary cone in which the axis of rocking in each special case is placed.

The turning of the guide plate of the valve of the present invention is best limited and is, more specifically, so limited that the guide plate may be turned out of a middle position in one direction or the other through, in each case, a range of 30° to 60° and, preferably, 45°.

In a preferred working example of the single mixing valve of the present invention, the driving part has a U-like handle or grip running out from one side of the valve, for example forwards, in the direction of rocking of the driving part.

In one presently preferred embodiment of the invention, at the position which is in the middle of the range of turning or mixing of the plug, the inlet ports of the plug and, more specially, furthermore the ports of the inlet ducts in the valve seat face of the valve housing are preferably placed one after the other in a plane, which is parallel to the plane of rocking of the driving part. It can be seen from this that the single mixing valve of the present invention is very different not only in structure, but furthermore in function than single mixing valves of the sort noted at the start, in the case of which the inlet ports of the plug and the ports of the inlet ducts in the valve seat face for the plug, are, in all cases, placed side by side in planes running, in the middle of the range of turning of the plug, normal to the plane of rocking of the driving part. The ports in the valve seat face of the plug and the ports used therewith in the plug are, in the present invention, not parallel to each other (as in prior art single mixing valves of the sort noted) when rocking is taking place, and, in fact, they are placed in line one behind the other so that they are more or less completely placed on top of each other, a point which will be emphasized hereinafter.

The guide plate noted in the single mixing valve of the present invention is, as seen in plan, best made of a generally round form and turningly supported in a bearing body having a middle opening, the bearing body working with two stops on the guide plate, which may have a nosepiece or stop for limiting twisting or turning of the guide plate. In the case of a preferred working example, this bearing body is generally in the form of a ring, it forming the top part of the valve housing. It may be fixed in position with a union nut screwed onto the lower half of part of the valve housing.

The bearing body may have a seal on the side facing the plug, taking effect on the plug. To make it simpler for the valve to be put together, a system such as a key and keyway for stopping twisting, may be placed between the bearing body and the lower part of the valve housing. In the case of a preferred example of the single mixing valve of the invention, the bearing body is designed so that it may be placed in the top of the lower part of the valve housing and has a side key taken up in an axially running keyway in the top of the lower part of the valve housing. The edge of the guide plate is best covered over by a thrust ring bearinged in the guide body.

The outlet port of the plug of the single mixing valve of the present invention is best placed between (the position "between" being thought of in connection with the axis of rocking of the driving part) the inlet ports of the plug but, however, is one-sidedly placed. Inlet ports of the plug may each be made up of a number of port parts, the inlet port parts being smaller when measured along a "longitude" than along a "latitude" and, more specially, half as large as along latitude.

In the case of a preferred working example of the invention, the ports of the inlet ducts in the valve seat face of the housing are placed symmetrically with respect to a plane which is normal to the plane of rocking of the driving part when the plug is in the middle of its range of turning, the inlet ports, or the port parts, of the plug and the ports of the inlet ducts best being so placed as to be cut by planes thought of as cutting through the plug and being parallel to the plane of rocking of the driving part when the plug is in the middle of its range of turning, the separate planes cutting futhermore not only the cold water, but furthermore the hot water ports or openings.

The outlet port of the plug in the single mixing valve of the present invention is best placed on the side of the plug's "equator" furthest from the driving part and, in this respect, is at 75° to 105° and, more specially about 90° of "longitude" from the rocking plane of the driving part, the ball's equator being in the plane normal to the driving part. The plane, in which, on the one hand, the lengthways axis and, on the other hand, the axis of rocking of the driving part are placed is so placed in a preferred working example of the invention as to be responsible for an unequal division of the lines joining corresponding cold and hot water inlet ports with the same form in the plug, that is to say symmetrically corresponding inlet ports, the plane of symmetry making an angle of about 15° to 25° and, more specially, 20° with the plane, on which, on the one hand, the lengthways axis and, on the other hand, the axis of turning of the driving part are placed.

In order to make certain that, in the case of a design in which in the side of the valve seat facing the guide plate, the inlet ports are placed symmetrically, the one position of rocking of the driving part being the shut position and the other being the open position. The inlet port of the plug is best positioned so as to be nearer to the plane, having within it the axis of turning and the lengthways axis of the driving part.

The inlet ports of the plug may be made up of at least two port parts and, more specially, at least two small port parts and one large port part, the larger ports being nearer to the outlet port than the smaller inlet ports. It is possible to have a number of smaller, elongated ports, which are more specially parallel to each other. The inlet ports of the plug are best lined up with each other on a round path, whose plane is parallel to the axis of rocking and with respect to which the plane, having in it the lengthways axis of the driving part and the axis of rocking, is placed at a slope, more specially at an angle of 65° to 75°, the best angle being about 70°. The breadth of the ports on the plug's outer face measured in a direction normal to said path is best made generally equal to the inner diameter of the inlet duct ports. The larger ports in the plug are, in relation to the plane of rocking of the driving part, on the outlet port side, while the smaller ports are on the opposite side, the small ports being generally next to the large ports at the plane of rocking of the driving part.

The inlet ports or the imaginary middle points of the inlet port parts of the plug are best on radial lines of the plug which are placed at an angle of 60° to 100° and, more specially, 80° to each other. In the case of a preferred working example of the invention, the radial line of the port, placed further from the lengthways axis, of the plug is at an angle of 50° to 70° to the part, furthest from the driving part, of the lengthways axis of the driving part. The radial line of the inlet which is nearer to the lengthways axis, of the plug makes an angle of more specially 20° to 30° with the part, furthest from the driving part, of the lengthways axis of the driving part. The radial line of the outlet port of the plug makes an angle in the range of 40° to 60° and, more specially with a value of 50° with the part (furthest from the driving part) of the lengthways axis of the driving part.

The single mixing valve of the present invention is best so designed that, without being dependent on the mixing adjustment, in the shut-down position of the valve, one inlet port part of the plug is between the port parts of the inlet ducts in the valve seat face of the plug, while the other inlet port part is clear of the inlet duct port.

The guiding bridging parts between the inlet duct ports and the large-size outlet duct port in the valve seating face are best made narrower than the working diameter of the inlet ports and, more specially, narrower than the clearance diameter of the inlet ports, the edges of the ports of the inlet ducts being glanded by rubber glands taking effect on the plug and the separate port parts of the inlet port may be cut up by bridging parts lined up with the face of the plug.

For fixing the valve in a position, in which the inlet ducts are placed (as seen by the user) one in front of the other into the valve seat face generally in an upward opening direction, that inlet, which is nearer to the user, is best placed nearer the plane (running through the rocking axis and the lengthways axis of the driving part) than the plug's inlet which is farther to the back.

One inlet of the plug is, in the shut position of the valve, preferably within a circle, centered, (in the valve's shut position) on the axis of turning, and whose radius is smaller than the shortest distance from the nearest limit of an opening in the valve seat face.

The other inlets of the plug are in this case best placed outside a circle, running (in the shut position of the valve) round the axis of turning, and which is placed within a plane normal to the axis of turning, and has within it, at least, the corresponding opening (and more specially the two openings) of the inlet ducts in the valve seat face.

For the account of the geometry and positioning of the axes and planes of the ball-like plug and the valve housing, some further points are to be noted:

The position or angle of the plug of the mixing valve of the present invention may be changed by moving the driving part fixed to the plug.

For this reason the plug may be rocked about an axis (axis of rocking) running through its middle point and may be turned furthermore about an axis of turning running, at every angle, normal to the rocking axis and running through the middle point of the plug.

The axis of turning of the plug, as seen from the valve's housing, keeps to the same position, whereas the position of the rocking axis at any given time, again seen from the valve housing, is dependent on the angle of turning of the plug or the guide plate at the given time. As seen from the valve housing, the axis of rocking or the axes, about which rocking of the plug is possible, may be said to be in a plane normal to the axis of turning of the plug, the axes making a right angle, in each case, with the lengthways axis of the driving part.

As seen from the plug, the two axes, about which the plug may be turned and rocked by changing the position of the driving part, are to be differently defined: the rocking axis is an axis keeping the same position at all times, and being normal to the lengthways axis of the driving part, whereas the turning axis is one whose position is dependent on the angle of rocking at any given time and which is in a plane in the plane of rocking of the driving part. The axis of turning of the valve plug is fixed in relation to the valve's housing; it is normal in relation to the guide plate and goes through its middle point.

BRIEF DESCRIPTION OF THE DRAWINGS

Further details and useful effects of the invention will be seen from the claims and the following description, of one working example of the mixing valve of the present invention, in conjunction with the figures, which are, in each case, diagrammatic.

DETAILED DESCRIPTION OF THE PREFERRED EMBODIMENTS

Figure 1:
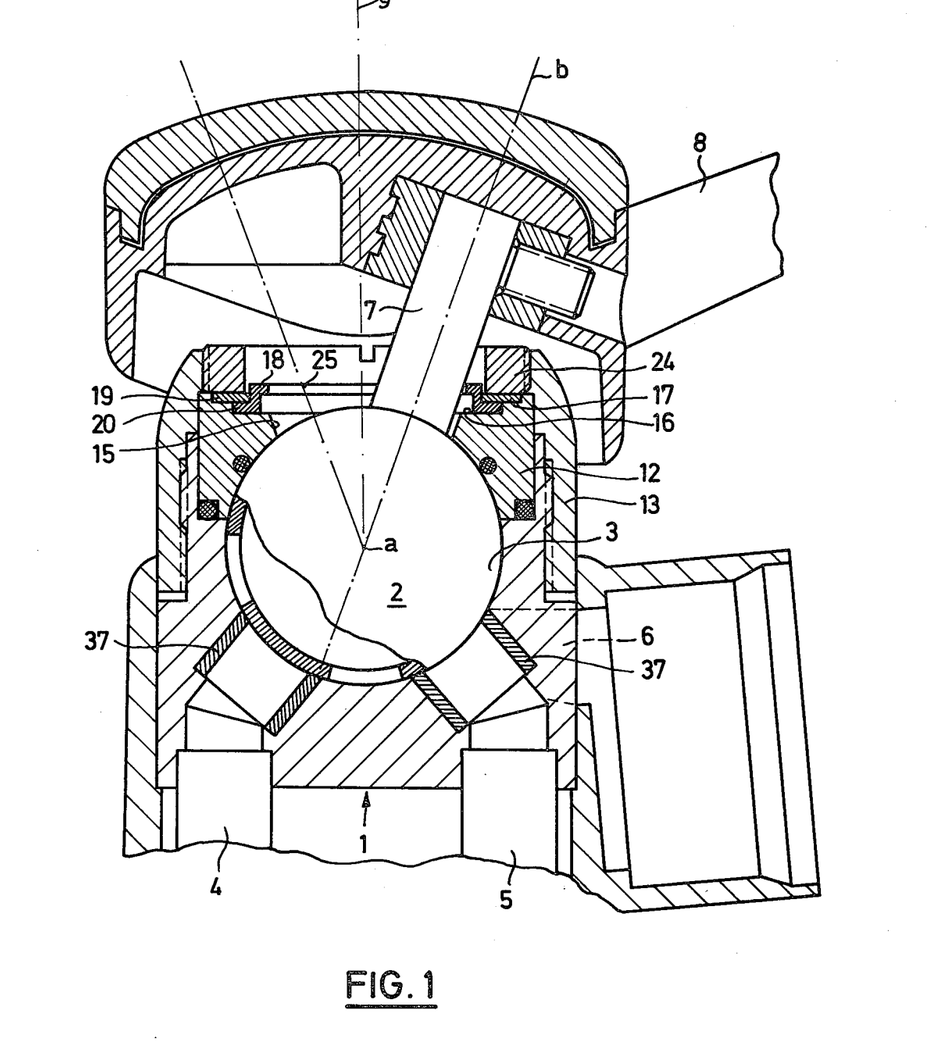
FIG. 1 is a partly sectioned side view of the single control faucet or mixing valve of the present invention in the turned off or shut position, the valve being designed for use on a washbasin.
Figure 2:
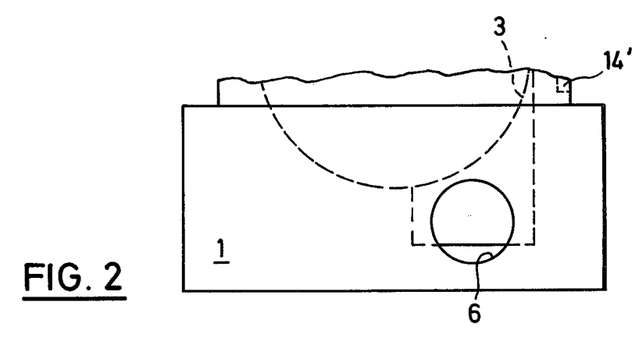
FIG. 2 is a part side view of the valve housing of the single mixing valve of FIG. 1.

The mixing valve or single control faucet to be seen in FIG. 1 has a valve housing 1 with an inner valve seat face 3 in line with the form of the ball-plug 2 turningly supported within the face 3. Valve seat face 3 has openings through it; the port of an inlet duct 4 for cold water and the port at the end of an inlet duct 5 for hot water, and furthermore the port of an outlet duct 6.

Plug 2 has a driving part 7, a pin which is locked in it and which has, at its end furthest from plug 2, a loop-like arm or grip 8 running out from the valve in the direction of rocking of driving part 7. Plug 2 is hollow and has the inlet port 9, 9' and 9" for cold water and inlet port 10, 10' and 10" for hot water and furthermore an outlet port 11, such ports being able to be lined up to a larger or smaller degree with the ports of the inlet ducts 4 to 6 by turning and/or rocking plug 2, as will be detailed further on in the present account.

Figure 4:
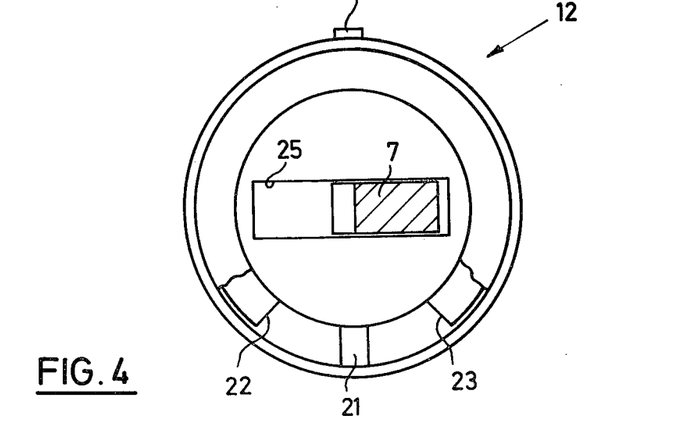
FIG. 4 is a view looking down onto the guide plate and the bearing body used therewith of the single mixing valve of FIG. 1.

In the lower part of housing 1, a bearing body 12 is placed, generally of a ring-like form, which is slipped into position in a downward direction and fixed to the housing 1 by way of a union nut 13 screwed onto the housing. Bearing body 12 has a key 14 (see FIG. 4) for which, in the top part of housing 1, there is an axially running keyway 14' so that the bearing body 12 may only be slipped into the lower part of housing 1 after being so lined up that its key may be slipped into the keyway 14' in the top part of the lower part of housing 1, the purpose further being to make certain that bearing body 12 may not be twisted once it has been put into position.

The generally ring-like bearing body 12 has a middle opening 15 with the driving part 7 of plug 2 running upwardly therethrough. On the side, opposite to the plug 2, bearing body 12 has two step-like round shoulders 16 and 17 acting as bearing faces for a guide plate 18 in the one case and of a bearing ring 19 in the other case. The generally round guide plate 18 has a middle part, whose outer diameter is generally the same as the inner diameter of the bearing ring 19. Next to this middle part of guide plate 18, there is a downwardly running lip 20, positioned under bearing ring 19, and which is bearinged on the lower step-like shoulder 16 of bearing body 12, it stretching round the middle part of guide plate 18 for about 260°, as may be seen from FIG. 4. On shoulder 16 a nosepiece 21 is fixed, taking the form of a stop for use with the ends 22, 23 placed opposite to each other, of edge 20 of guide plate 18 so that guide plate 18 may be turned out of a middle position or straight forward position, to one side or the other through an angle of about 45° in each case.

The lip 20 of guide plate 18 is, as we have seen, covered on the side, opposite to the plug side, by the bearing ring 19 which is supported on shoulder 17. The side, opposite to the plug side, of bearing ring 19 has a keeper ring 24, resting against it, which is screwed downwards into union nut 13 to take the form of an upper bearing for keeping down the plug.

In the middle part of guide plate 18, there is a, generally speaking, narrow opening 25 or slot, whose breadth is generally the same as the breadth of the driving part 7 (of plug 2), which, in cross-section is rectangular, so that the driving part may not be twisted in relation to the guide plate 18.

The range of twisting, limited by the edge ends 22 and 23 coming up against nosepiece 21, of the guide plate 18 and the size of the slot 25 in the middle part of the guide plate 18 make certain that the plug 2 may not be turned and/or rocked in any way that might be thought of, motion of plug 2 being in fact limited to turning out of a middle position to the right or the left through an angle of, at the most, about 45°, and/or rocked about an axis a which is normal to a plane whose position is fixed by the middle point of plug 2, the lengthways axis b of the driving part 7 and the direction at any given time of slot 25. If the single control faucet or mixing valve has been so put in position that the lengthways axis of its housing is upright and the guide plate 18 is horizontal, the outcome will be that the single axis a, about which plug 2 may be rocked in a given case, is horizontal so that any skewing of the loop- or U-like grip 8, which would make operation of the grip harder, is stopped. The loop-like grip 8 is, in fact, at all times, in a plane which is parallel to the only possible axis a of rocking of the driving part 7 and is normal to its plane of rocking.

Figure 5:
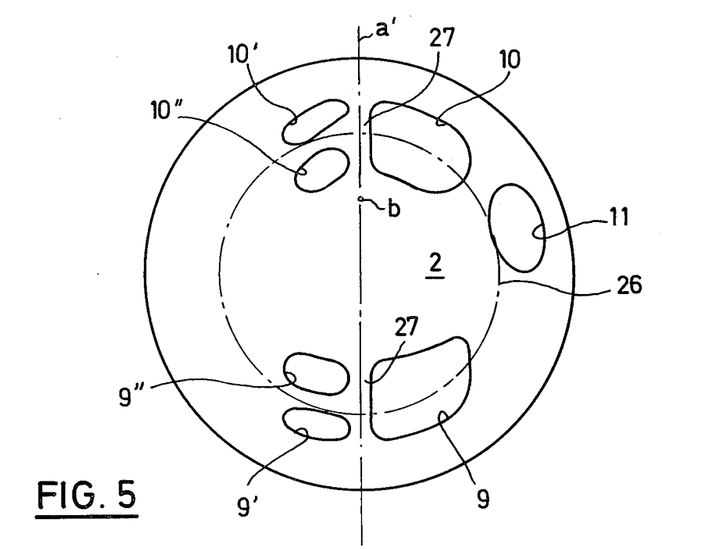
FIG. 5 is a view of the ball-plug of the single mixing valve of FIG. 1 on a greater scale, looking in a upward direction, the plug being in a position rocked in relation to the lengthways axis of its driving part.

As we have seen, plug 2 is hollow and in the form to be seen in FIG. 5, has a cold water port made up of port parts of which one 9 is larger than the two other port parts 9' and 9". Furthermore, the hot water inlet port is made up of a port part 10, which is larger than two smaller port parts 10' and 10". Furthermore, plug 2 has an outlet port 11. The smaller port parts 9' and 9" and, in the other case, 10', 10" are, in each case, like slots and placed parallel to each other side by side. The two inlet ports, made up of their different port parts, are placed on a circle 26, which is eccentric. The larger inlet port parts 9 and 10 are on the outlet port side of the rocking plane a' of the driving part 7, which the smaller inlet port parts 9' and 9" and, in the other case, 10' and 10" are positioned on the other side. The plane a' of rocking of the driving part 7 is generally in the middle of the bridging connection 27 running between and separating the larger inlet port parts 9 and 10 from the smaller port parts 9', 9", 10', 10". The larger inlet port parts 9 and 10 are generally rhombic in form. The edge, furthest from the smaller inlet port parts 9', 9" and, in the other case, 10' and 10", of the larger inlet port 9 is rounded off at the rhomb corner while the larger inlet port 10 is rounded off at two rhomb corners. Outlet port 11 has a generally round opening cross-section, which is generally equal to the cross-section of one of the two inlet ducts 4 and 5. These inlet ducts 4 and 5 are, as looked at from the position of the user, placed one to the back of the other in a plane which is parallel to the plane a', in which the plug 2 may be rocked in its middle of turning range position.

The single control faucet or mixing valve of the present invention is so designed and its parts are of such a size and so placed that the inlet ports are shut off once the loop-like grip 8 joined up with the driving part 7, is moved downwards, see FIG. 1. If loop-like grip 8 is lifted, the one and/or the other port in the plug is put into line to a larger or smaller degree with the ports of the inlet ducts 4 and 5 in the valve seat face of plug 2 so that the inner space of plug 2 is now responsible for forming a connection between the ports of inlet ducts 4 and 5 and the port of the outlet duct 6, such connection being dependent in its size on the degree of twisting of the plug.

By turning the plug about an axis g of turning, which is based on FIG. 1 in the plane of the figure and parallel to the two inlet ducts, the temperature of the liquid coming from the valve may be controlled as desired, without changing the rate of the liquid. The loop-like grip 8 only has to be moved as far as is necessary to the right or to the left. It is naturally possible, in a single operation for not only the temperature, but furthermore the rate of the liquid coming from the valve to be changed. The loop-like grip 8 only has to be lifted or moved downwards to the necessary degree and to be forced to the right or the left.

Figure 6:
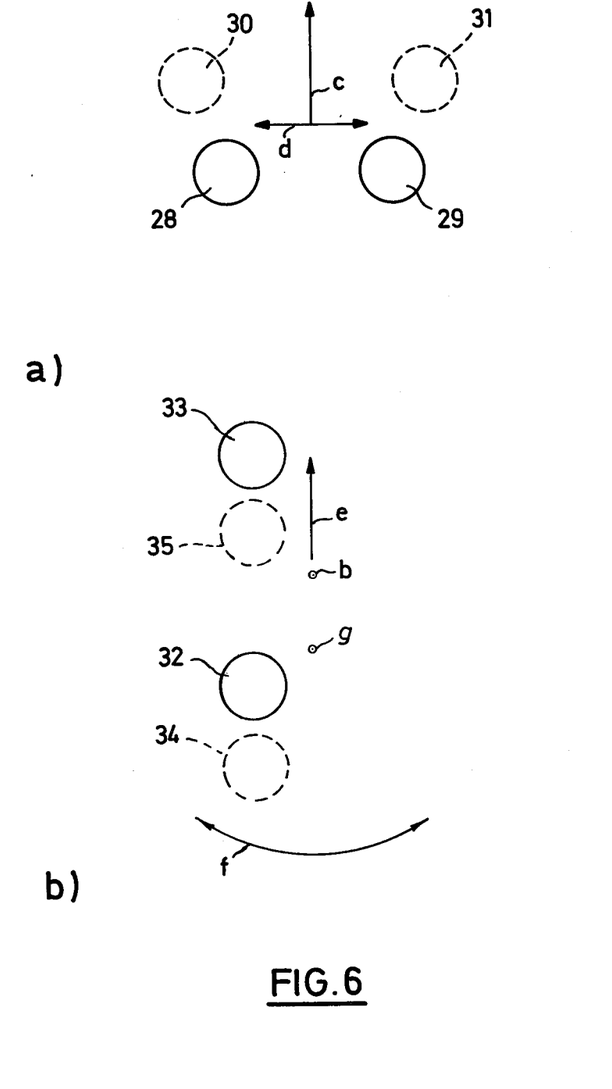
FIG. 6 is a view of the system of plug inlet ports and the inlet port of the inlet fluidways in the single mixing valve of the present invention to make a comparison with prior art single mixing valves, the ports being seen from inside the plug.

In FIG. 6a, in the shut off middle point of turning of the driving part in question, it is possible to see diagrammatically from a point inside the plug, the hot water inlet port 28 of a plug, which is part of the prior art and the cold water inlet port 29 of this plug together with the ports 30 and 31 of the hot water and cold water ducts opening through the valve seat supporting the plug. The direction of rocking of the driving part in question is arrowed c and the direction of turning of the plug's equator is marked by arrow d.

In FIG. 6b, in which the system is again to be seen in the shut off middle of turning position of the driving part, one can see the hot water inlet port 32 of a plug forming part of the invention and the cold water inlet port 33 together with ports 34 and 35 of the hot water and cold water ducts opening in the valve seat face of the plug. Such ports are viewed from a point inside the plug.

The direction of rocking of driving part is arrowed e while the direction of turning of the valve plug about axis g is marked with arrow f.

Figure 3:
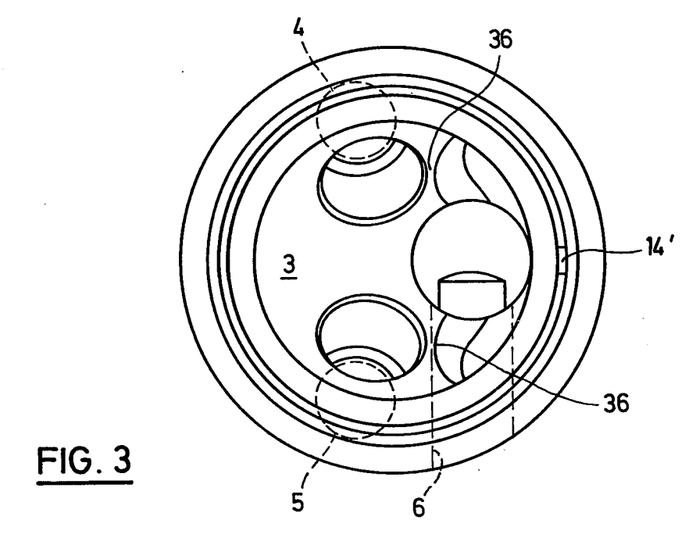
FIG. 3 is a view looking down onto the valve housing to be seen in FIG. 2.

Bridging parts 36 between the inlet duct ports and the port, which is larger in size, of the outlet duct 6 in the valve seat face 3 are, as will be seen from FIG. 3, very much narrower than the working diameter of the inlet ports of the plug and, more specially are narrower than the working or clearance diameter of the inlet ports 9 and 10 so that the same may be used at the same time as an outlet. By designing the inlets in the right way, it is possible to do without a separate outlet.

The port edges of the inlet ducts 4 and 5 may be seen (FIG. 1) to have rubber glands 37 resting liquid-tightly against plug 2, such glands not being viewed in FIG. 3 to make the figure more straightforward.

What is claimed is:

1. In a mixing valve for liquids, having: a ball-like valve plug with liquid inlet and liquid outlet ports therein, said ports being joined together within said plug; a valve housing having a valve seat face of the same form as the plug with said plug resting thereon, said plug and said housing having a common middle point about which said plug is rotatable relative to said housing, said housing having inlet ducts for the liquids to be mixed and an outlet duct for the mixed liquids, said ducts having ports in said face; and, a driving part fixed to said plug, rockable in a plane of rocking therewith about a rocking axis perpendicular to the rocking plane, for changing the outlet flow rate of liquid from the valve and rotatable therewith for changing the mixing ratio of the two liquids, said driving part having a lengthwise axis, the invention comprising: a guide plate for said driving part, said plate having a slot in and along which said driving part is movable, but keyed against rotation relative to said slot, said guide plate being turnable in a plane parallel to said rocking axis, said plug being rotatable only about a plug rotation axis which is perpendicular to said guide plate plane, runs through said middle point and is fixed relative to said valve housing but not said plug, and said driving part being rockable only about said rocking axis, which runs through said middle point and is fixed relative to said plug but not said valve housing.

2. The mixing valve as claimed in claim 1, further comprising means for limiting turning of said guide plate.

3. The mixing valve as claimed in claims 1 or 2, further comprising a handle on said driving part extending outwardly from one side of the valve in the direction of rocking of the driving part.

4. The mixing valve as claimed in claim 1, wherein the inlet ports of said plug are in positions one after the other in a section plane parallel to the plane of rocking of the driving part.

5. The mixing valve as claimed in claim 4, wherein said inlet ports of said ducts in said housing are in a section plane parallel to the plane of rocking of the driving part, when the driving part is in the middle of its range of turning.

6. The mixing valve as claimed in claim 1, wherein said guide plate, when viewed from the driving part side of the housing, is generally round, said housing having a bearing body positioned in a middle opening in said housing, said body having a stop designed for use with two stops on said guide plate for limiting turning of said guide plate.

7. The mixing valve as claimed in claim 6, having a key system, placed between said bearing body and a lower part of said valve housing, for stopping undesired twisting of said body in said housing.

8. The mixing valve as claimed in claim 1, wherein said outlet port of said plug, relative to the plane of rocking of said driving part, is positioned between said inlet ports of said plug, but out of line therewith and to the side thereof.

9. The mixing valve as claimed in claim 1, wherein said inlet ports of said plug are divided into a number of port parts by bridging connections.

10. The mixing valve as claimed in claim 9, wherein said inlet port parts are smaller as measured along a longitude of said plug than along a latitude.

11. The mixing valve as claimed in claim 10, wherein said inlet port parts are half as long along a longitude as along a latitude.

12. The mixing valve as claimed in claim 9, wherein the parts of the inlet ports in the valve seat face of said valve housing are placed symmetrically to the two sides of a plane of symmetry which, in the middle of the range of turning of the plug, is normal to the plane of rocking of the driving part.

13. A mixing valve as claimed in claim 1, designed for mixing hot and cold water, wherein the inlet ports used for hot and cold water of the plug and the ports of the inlet ducts are cut by spherical section planes, running parallel to the rocking axis of the driving part, such separate planes cutting not only the cold water ports, but the hot water ports as well.

14. A mixing valve as claimed in claim 1, wherein the outlet port of the plug in the middle of the range of turning of the plug is placed on the other side of an equator of the plug relative to the driving part side and makes an angle in the range of 45° to 105° with the rocking plane of said driving part.

15. A mixing valve as claimed in claim 1, wherein a plane having within it the lengthways axis of said driving part and the rocking axis defines lines for cutting up corresponding inlet ports of said plug into unequal parts, said ports being for hot and cold water.

16. A mixing valve as claimed in claim 15, wherein said corresponding inlet ports are generally symmetrical in relation to each other about a plane of symmetry at an angle of roughly 20° to the plane having in it the lengthways axis of said driving part and the axis of rocking.

17. A mixing valve as claimed in claim 1, designed for fixing in position on pipes such that, as seen by the users of the valve, the inlet ducts come upwards one in front of the other to their ports in the valve seat face, the inlet port nearer to the users of the plug being less far from the plane running through the rocking axis and the lengthways axis than the plug's other inlet port to the back of the frontmost said inlet port.

18. A mixing valve as claimed in claim 9 wherein the inlet ports of the plug each have one smaller port part and a larger port part nearer said outlet port than said smaller port part.

19. A mixing valve as claimed in claim 18, wherein each inlet port of said plug has one larger port part and at least two port parts each longer than they are broad.

20. A mixing valve as claimed in claim 18, wherein said smaller inlet port parts of each inlet port are parallel to each other.

21. A mixing valve as claimed in claim 1, wherein said inlet ports of said plug are placed on a round path in a plane parallel to the axis of rocking.

22. A mixing valve as claimed in claim 21, wherein the plane of the round path is at an angle in a range of 65° to 75° relative to the plane of the lengthways axis of the driving part and the rocking axis, and wherein the breadth of the said ports on the plug's outer face, measured in a direction normal to the path, is generally equal the diameter of the ports of the inlet ducts.

23. A mixing valve as claimed in claim 19, wherein, relative to the rocking plane of the driving part, the larger port parts are on the outlet port side of said rocking plane and the smaller ones are on the other side thereof.

24. A mixing valve as claimed in claim 23, wherein the smaller parts of the ports are nearest to the larger port parts at said rocking plane.

25. A mixing valve as claimed in claim 1, wherein radial lines of said plug running through middle points of said inlet ports define an angle in a range of 60° to 100°.

26. A mixing valve as claimed in claim 1, wherein a radial line of the plug through that one of said inlet ports which is farther from said lengthways axis than said other inlet port makes an angle in a range of 50° to 70° with a part of said lengthways axis farthest from said driving part.

27. A mixing valve as claimed in claim 1, wherein a radial line of the plug through that one of said inlet ports which is nearer to said lengthways axis than said other inlet port makes an angle in a range of 20° to 30° with a part of said lengthways axis farthest from said driving part.

28. A mixing valve as claimed in claim 1, wherein a radial line of said plug running through said outlet port of said plug makes an angle in a range of 40° to 60° with a part of said lengthways axis farthest from said driving part.

29. A mixing valve as claimed in claim 1, wherein, in a shut down position of said plug, one inlet port thereof is within a circle centered on said axis of turning, in said valve shut down position, the radius of said circle being smaller than the smallest distance to the nearest part of a port edge in said valve seat face.

30. A mixing valve as claimed in claim 29, wherein other inlet ports of said plug are, in the plug's shut down position a circle centered, in said shut down position, on said axis of turning, and are placed in a plane normal to said axis of turning, the plane going through the inlet port of the inlet duct used with said inlet port of said plug.

31. A mixing valve as claimed in claim 30, wherein said circle goes thorugh the two inlet ports of said ducts.

32. A mixing valve as claimed in claim 1, wherein the parts of said seat face between the duct inlet ports and the outlet port in said face are narrower than the acting diameter of the inlet ports in the seat face.

33. A mixing valve as claimed in claim 32, wherein said inlet ports of said plug are divided into a number of port parts by bridging connections, larger parts of said inlet ports having a clearance diameter greater than the parts of said seat face between the duct inlet ports and the outlet port in said face.

34. A mixing valve as claimed in claim 1, having rubber glands at the edges of said inlet ducts, said glands resting against said plug, said inlet ports of said plug being divided into separate parts by bridging pieces of said seat face.

35. A mixing valve as claimed in claim 1, wherein the distance between edges of the plug's inlet ports is equal to the spacing between edges of the ducts porting out in the valve seat face.

36. A mixing valve as claimed in claim 14, wherein the angle is preferably about 90°.

37. A mixing valve as claimed in claim 22, wherein the angle is preferably about 70°.

38. A mixing valve as claimed in claim 25, wherein the angle is preferably about 80°.

39. A mixing valve as claimed in claim 28, wherein the angle is preferably about 50°.

* * * * *

UNITED STATES PATENT AND TRADEMARK OFFICE
CERTIFICATE OF CORRECTION

PATENT NO. : 4,449,551

DATED : May 22, 1984

INVENTOR(S) : WERNER LORCH

It is certified that error appears in the above-identified patent and that said Letters Patent is hereby corrected as shown below:

IN THE ABSTRACT:
Line 9, "moved" should be --rotated--.

IN THE SPECIFICATION:
Column 3, line 4, ", more specially, furthermore" should be deleted.
Column 4, line 25, replace "The" with --One--.
Column 11, line 27, after "position" insert --outside of--.

Signed and Sealed this

Twenty-sixth Day of March 1985

[SEAL]

Attest:

DONALD J. QUIGG

*Attesting Officer*   *Acting Commissioner of Patents and Trademarks*